Patented Mar. 20, 1934

1,951,469

UNITED STATES PATENT OFFICE 1,951,469

WETTING AND DISPERSING AGENTS

Heinrich Bertsch, Chemnitz, Germany, assignor to firm H. Th. Böhme Aktiengesellschaft, Chemnitz, Germany, a company of Germany No Drawing. Application August 2, 1930, Serial No. 472,763. In Germany September 21, 1929

11 Claims. (Cl. 260—98)

This invention relates to wetting, cleansing, foaming and dispersing agents.

It is known to employ the sulphonation products of fatty acids and fatty acid derivatives as agents for increasing the wetting, cleansing, dispersing and foaming properties of liquids.

According to this invention it has been found that water-soluble products, which are admirably suited for the above described purposes, as such or in the form of their salts, are obtained by the action of sulphonating and sulphating agents on higher unsaturated aliphatic amines and higher aliphatic hydroxy amines having more than eight carbon atoms in the chain. The products obtained are either sulphuric acid esters or true sulphonic acids of aliphatic hydroxy amines or unsaturated amines depending on the conditions employed during the sulphonation.

*Examples*

1. 325 kgms. of octadecenylamine are sulphonated at 25° C. with 400 kgms. of concentrated sulphuric acid. After the product has become water-soluble, it is pressed on to ice, washed with saturated Glauber's salt solution in order to remove the excess of sulphuric acid and finally neutralized with caustic soda solution.

2. 380 kgms. of octadecanolamine hydrochloride are introduced into 200 kgms. of trichlorethylene and sulphonated at 10° C. with 120 kgms. of chlorsulphonic acid. The product is pressed on to ice and washed with saturated Glauber's salt solution in order to remove the excess of sulphuric acid and hydrochloric acid. The mass is then neutralized with caustic soda solution and the trichlorethylene distilled off.

3. 325 kgms. of octadecenylamine are sulphonated at 25° C. with 325 kgms. of concentrated sulphuric acid and 110 kgms. of acetic anhydride. The product is pressed on to ice, washed with saturated Glauber's salt solution in order to remove the excess of sulphuric acid and acetic acid and neutralized with caustic soda solution.

In Examples 1 and 2 above, it will be noted that the initial reaction is effected under mild conditions favoring the formation of sulphates or sulphuric acid esters. In Example 3, energetic conditions are employed, the same favoring the formation of true sulphonic acids.

The products obtained in this way are readily soluble in water, and have strong wetting and foaming properties and are very stable in hard water, acids, alkaline solutions and concentrated salt solutions. The products having the constitution of true sulphonic acids in particular are so resistant to boiling with acids and to dry heating to high temperatures that they do not thereby split off the combined sulphuric acid.

The sulphonation and sulphation products which may be referred to collectively as sulphuric reaction products, of the higher aliphatic and unsaturated hydroxy amines may, therefore be advantageously employed wherever wetting, cleansing, foam production, dispersing and dissolving or transference of active constituents are required. They may be employed as such alone or in admixture with other substances, such as aromatic sulphonic acids and their salts, sulphonated oils, soaps or organic solvents (hydrocarbons, halogen derivatives of hydrocarbons, higher alcohols, ketones, etc.). The products are particularly suitable for use in the textile and leather industries, the splitting of fats, the pharmaceutical industry, the preparation of vermicides as well as of treatment liquids for metal working, for example bore oils.

What I claim is:—

1. The process of preparing wetting and dispersing agents comprising reacting a sulphating and sulphonating agent with an amine selected from the group consisting of unsaturated aliphatic amines and aliphatic hydroxy amines, having more than 8 carbon atoms in the chain.

2. The process of preparing wetting and dispersing agents comprising reacting a sulphating and sulphonating agent with an amine selected from the group consisting of unsaturated aliphatic amines and aliphatic hydroxy amines, having more than 8 carbon atoms in the chain, adding ice and washing the oily products with Glauber's salt to remove free acid.

3. The process of preparing wetting and dispersing agents comprising reacting a sulphating and sulphonating agent with an amine selected from the group consisting of unsaturated aliphatic amines and aliphatic hydroxy amines, having more than 8 carbon atoms in the chain, adding ice, washing the oily products with Glauber's salt to remove free acid and neutralizing with caustic soda solution.

4. The process as described in claim 1 wherein the reaction is effected under mild conditions, whereby mainly sulphuric acid esters are formed.

5. The process as described in claim 1 wherein the reaction is effected under energetic conditions, whereby mainly sulphonic acids are formed.

6. The process of preparing wetting and dispersing agents comprising reacting a sulphating and sulphonating agent with an unsaturated aliphatic amine having more than 8 carbon atoms in the chain.

7. The process of preparing wetting and dispersing agents comprising reacting a sulphating and sulphonating agent with an aliphatic hydroxy amine having more than 8 carbon atoms in the chain.

8. A sulphuric reaction product of an amine selected from the group consisting of unsaturated aliphatic amines and aliphatic hydroxy amines having more than 8 carbon atoms in the chain.

9. A sulphonated amine selected from the group consisting of unsaturated aliphatic amines and aliphatic hydroxy amines having more than 8 carbon atoms in the chain.

10. A sulphated amine selected from the group consisting of unsaturated aliphatic amines and aliphatic hydroxy amines having more than 8 carbon atoms in the chain.

11. Sodium salts of sulphuric reaction products of amines selected from the group consisting of unsaturated aliphatic amines and aliphatic hydroxy amines having more than 8 carbon atoms in the chain.

HEINRICH BERTSCH.